May 17, 1938.　　　　A. E. PRICE　　　　2,117,854
DIFFERENTIAL PINION GAUGE
Filed Aug. 17, 1936
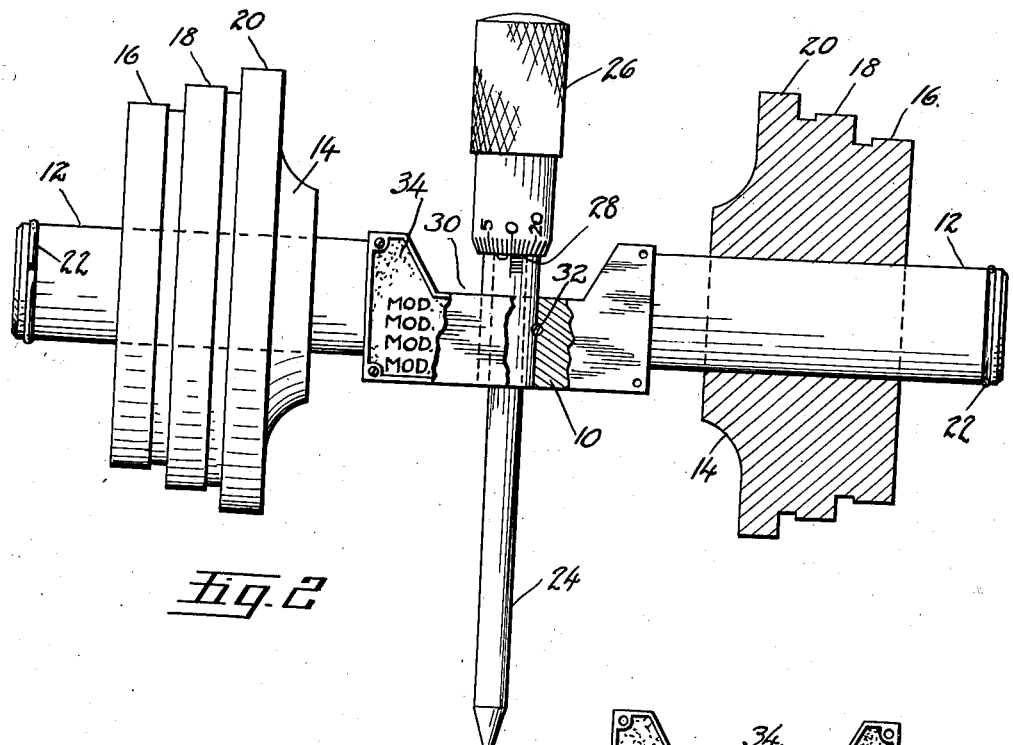
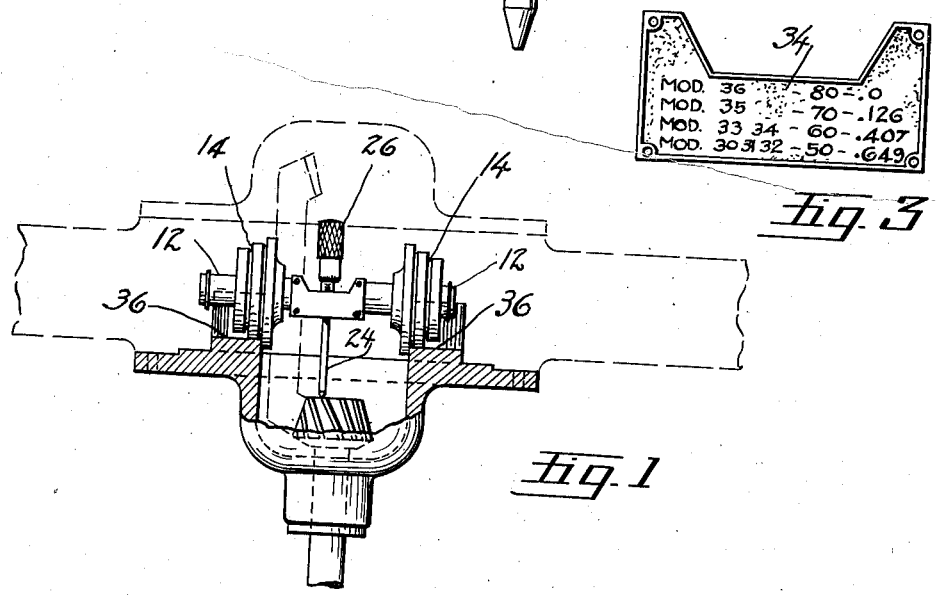
INVENTOR.
Arthur E. Price
BY
Parker & Burton
ATTORNEYS.

Patented May 17, 1938

2,117,854

UNITED STATES PATENT OFFICE 2,117,854

DIFFERENTIAL PINION GAUGE

Arthur E. Price, Jackson, Mich., assignor to Hinckley-Myers Company, Jackson, Mich., a corporation of Michigan Application August 17, 1936, Serial No. 96,339

4 Claims. (Cl. 33—169)

This invention relates to an improved automobile rear axle pinion setting device or gauge.

An object is to provide a gauge of the character described whereby the exact position of the pinion of a rear axle assembly such as is provided in automobiles and trucks, as compared with the proper intended position of the pinion in such assembly, may be quickly determined and any variation between such proper intended position and the position occupied by the pinion may be readily determined.

Another object is to provide a simple, inexpensive, accurate measuring instrument adapted to afford a quick and positive method of determining exactly the required adjustment of the pinion gear with respect to the ring gear of an automobile or a truck rear axle drive assembly in order to provide the proper running condition as to noise and tooth wear.

In repair or replacement of differential assembly operating parts it is customary to remove the differential assembly from the housing. The pinion is adjusted accurately with respect to the ring gear by means of shims or the like. It is customary for the manufacturer to have a set point or mating point of the ring gear with respect to the pinion and to indicate permissible variation from said true seating. This improved gauge is adapted to indicate whether the pinion is properly positioned with respect to the ring gear and if such pinion requires adjustment to indicate the exact adjustment required to insure proper mating of the pinion with the ring gear.

The tool is adaptable to different models of cars as hereinafter described and mechanism is provided to insure the obtaining of this result.

Other objects, advantages, and meritorious features will more fully appear from the following specification, appended claims, and accompanying drawing, wherein:

Figure 1 is a sectional view through a differential casing member showing my improved gauge in use, Fig. 2 is an elevation of my improved gauge partly broken away, and Fig. 3 is an elevation of a fragment of the gauge structure.

This improved gauge is employed to determine the position of the drive pinion with respect to the ring gear in a differential drive such as is used in motor vehicles. To accomplish this the differential gears are removed from the casing. If a new pinion is to be inserted such pinion is dropped into position. The pinion setting gauge is then employed to determine this position and whether it is the one that should be occupied by the pinion in the particular assembly according to the specifications of the manufacturer.

The gauge comprises a body portion indicated generally as 10. Each end of this body portion is of a cylindrical shape as indicated at 12 and is ground to a true circumference. Mounted upon each end portion 12 is a disc cluster 14. This disc cluster comprises a plurality of discs. They are here shown as joined in one piece, the cluster being ground to provide the plurality of disc faces as indicated at 16, 18, and 20. These discs are of different diameter as shown. These diameters are determined by the diameter of the bearings in the differential casings of the different models of the car with which they are to be used. A disc cluster as a whole is slidable lengthwise upon end portion 12 of the body. A snap ring 22 may be employed to prevent the disc cluster from accidentally slipping off the end portion 12 of the body.

The measuring instrument which I prefer to employ is a micrometer gauge. It has a stem portion 24 adapted to be projected and withdrawn by rotation of a gripping handle 26. The micrometer is provided with indicating figures and lines 28 of standard construction to measure any minute advancements or withdrawals of the stem in a manner which is well understood.

The central portion of the body element 10 is cut away as at 30 and is apertured to receive the body of the micrometer therethrough as shown in Fig. 1. A pin 32 may be employed to lock the micrometer gauge in position. Numeral 34 indicates a plate which may be secured to the body element 10 and which may carry instructions as to operation of the device.

In operation the differential gearing is removed as heretofore set forth and my improved gauge is dropped into position as shown in Fig. 1 with the proper disc seated in semi-circular bearings 36 of the differential casing. Due to variation in different models of course the same disc will not be adaptable to the bearing of each model and a plurality of discs are provided so that the disc which supports the body may be seated snugly within the bearing to position the body of the gauge accurately with respect to the axis of the bearing.

The plate 34 which is shown in detail in Fig. 3 may carry instructions. In such figure it will appear that of the particular type of car in question model 80 of the year 1936 will require a zero setting of the gauge for accurate position of the pinion. On the other hand, model 50 of the years 1930–1932, inclusive, would require a .649 setting. When the gauge is dropped in place and the stem of the micrometer is projected against the end face thereof as shown in Fig. 1 the extent to which it varies from the proper setting is instantly determined and by means of shims or the like the pinion may be adjusted to its proper position for accurate mating with the ring gear, which ring gear is shown in dotted line in Fig. 1.

It is the distance between the axis of the bearings that seat the discs and the end face of the pinion contacted by the stem of the micrometer that is the distance upon which variation is measured. Determination by variation from a determined reading of the gauge as above described is the simplest method of measuring accuracy.

What I claim is:

1. A gauge of the character described comprising a body element, opposite ends of said element being provided with a corresponding series of circular discs of different diameter, the discs of each series of discs arranged in order of their diameter with the smallest disc nearest the outer end of the body element and the largest disc nearest the center of the body element, a measuring instrument carried by said body element and disposed between said discs, said measuring instrument including a part adapted to be adjustably projected and withdrawn radially of said discs with respect to the body element.

2. A gauge of the character described comprising a body element, opposite ends of said element each provided with a corresponding series of circular discs of different diameter adjustable lengthwise of the body element, the discs of each series of discs arranged in order of their diameter with the smallest disc nearest the outer end of the body element and the largest disc nearest the center of the body element, a measuring instrument carried by said body element and disposed between the discs, said measuring instrument including a member adapted to be adjustably projected and withdrawn radially of the discs with respect to the body element.

3. A gauge of the character described comprising a body element, opposite ends of said element each provided with a disc cluster adjustable lengthwise of the body element on the same axis, each disc cluster comprising a plurality of circular discs of different diameter arranged progressively from the smallest in diameter to the largest in diameter, a measuring instrument carried by the body element and disposed between the two disc clusters, said measuring instrument including a member adapted to be adjustably projected and withdrawn with respect to the body element and perpendicularly to the axis of said discs.

4. A gauge of the character described comprising, in combination, a central body element, cylindrical elements disposed coaxially on opposite sides of said central element, a gauging member carried by said central body element and supported for movement in a path perpendicular to the axis of said cylindrical elements, each cylindrical element slidably carrying a series of discs of different diameter, said series of discs corresponding to each other and arranged on the cylindrical elements in order of their diameters with the disc of each series having the largest diameter nearest the central body element, and means connecting the discs of each series together for joint slidable movement on its respective cylindrical element as a unit.

ARTHUR E. PRICE.